W. T. RUTLEDGE.
PUZZLE.
APPLICATION FILED APR. 7, 1913.

1,091,709.

Patented Mar. 31, 1914.
2 SHEETS—SHEET 1.

Witnesses,
F. E. Monteverde
Marie Battey

Inventor,
William T. Rutledge,
Attorneys

COLUMBIA PLANOGRAPH CO., WASHINGTON, D. C.

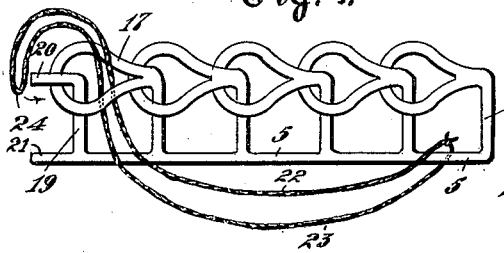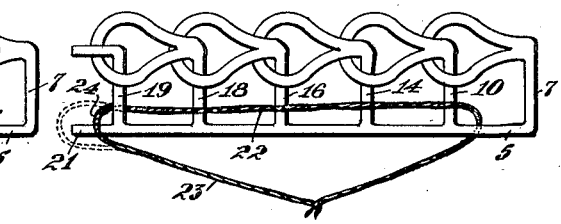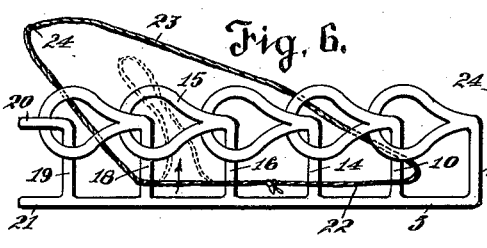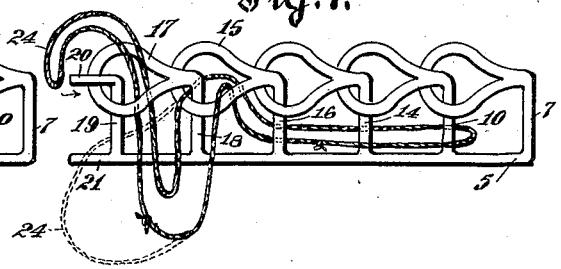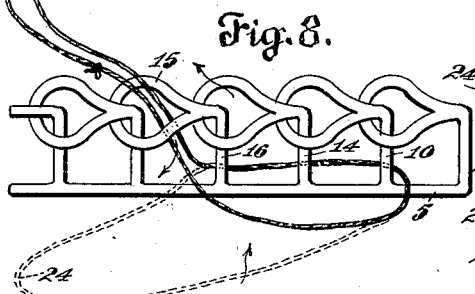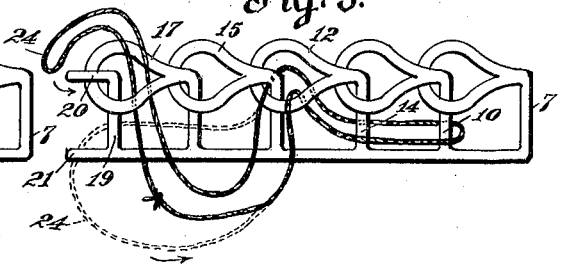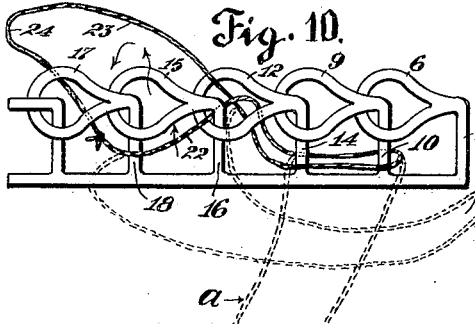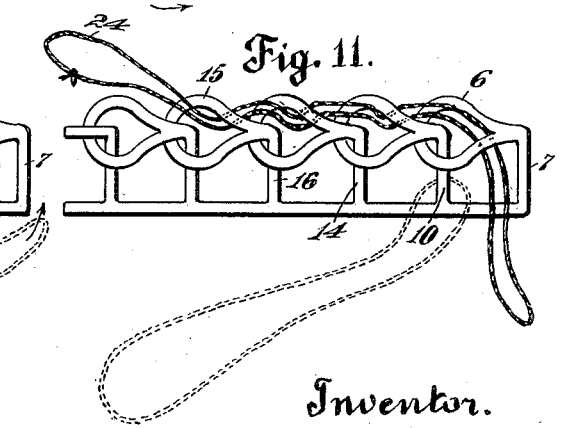

UNITED STATES PATENT OFFICE.

WILLIAM T. RUTLEDGE, OF REDLANDS, CALIFORNIA, ASSIGNOR OF ONE-HALF TO C. A. TRIPP, OF REDLANDS, CALIFORNIA.

PUZZLE.

1,091,709.   Specification of Letters Patent.   Patented Mar. 31, 1914.

Application filed April 7, 1913. Serial No. 759,303.

*To all whom it may concern:*

Be it known that I, WILLIAM T. RUTLEDGE, a citizen of the United States, and residing in the city of Redlands, in the county of San Bernardino, State of California, have invented a new and useful Improvement in Puzzles, of which the following is a specification.

This invention relates to a puzzle, and the principal object is to provide a puzzle having a plurality of rings or loops formed upon connected stems, the end ring encircling the stem of the adjacent ring, which in turn encircles the stem of the next succeeding ring, and so on throughout the series, the terminal ring encircling a stem having a hook portion or finger thereon.

It is a further object to provide a puzzle consisting of a series of engaged rings and stems as above described with a continuous cord adapted to encircle the stem of the end ring, which cord may be released by passing it through the various rings and from side to side of the device by numerous succeeding steps.

The invention primarily resides in an elongated base member having a series of ring carrying stems affixed thereto at intervals throughout its length, the ring on the end stem encircling the adjacent stem, the ring of which encircles its adjacent stem, and so on throughout the series, the terminal ring encircling a hook carrying stem mounted adjacent the end of the base member.

Figure 1:
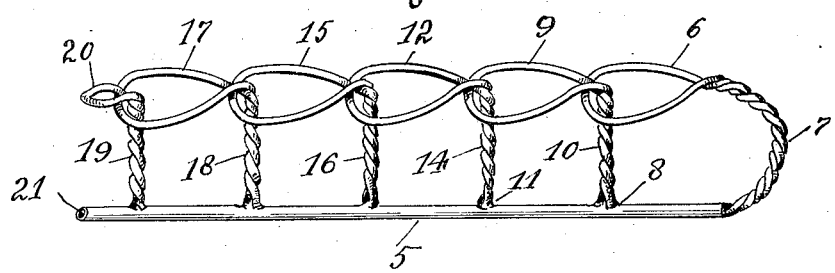
Figure 2:
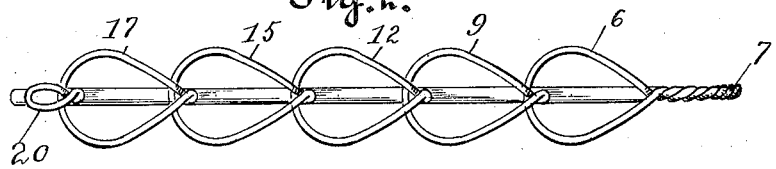
Figure 3:
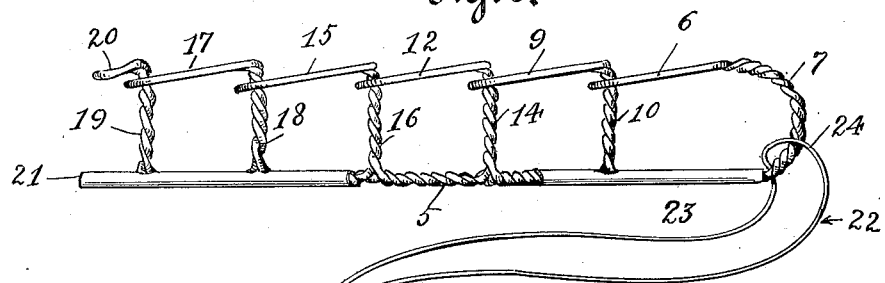

In the drawings accompanying this specification: Figure 1 is a perspective view of the puzzle showing it as formed of twisted wire. Fig. 2 is a plan view. Fig. 3 is a view in side elevation, showing the continuous cord in position in readiness for removal. Figs. 4, 5, 6, 7, 8, 9 and 10 are diagrammatic views illustrating the first portion of the successive steps employed in solving the puzzle. Fig. 11 is a diagram illustrating the final steps employed in solving the puzzle.

More specifically, 5 designates a body portion in the form of a rod preferably formed of an integral piece of wire, the middle portion of which is bent to form a ring 6, the wire then being twisted upon itself to form the end stem 7, this twisting being continued to the point 8 where one limb of the wire is passed up through the ring 7 and bent to form a ring 9, after which it is returned and twisted upon itself to form the stem 10 back to the point 8. The two portions of the wire are again twisted from the point 8 to the point 11 with one limb carried upward through the ring 9 and bent to form the ring 12 and returned upon itself to form the stem 14. This construction is repeated successively to form a ring 15 on a stem 16 encircled by the ring 12 and a ring 17 on a stem 18 encircled by the ring 15; the end ring 17 encircling a stem 19, the upper end of which is formed with a hook or finger 20. The ends of the wires terminate at a short distance beyond the stem 19 to form a projection 21. This projection is a continuation of the body portion or rod 5. The twisted body portion 5 of the stem is preferably inclosed in a reinforcing sleeve which is formed of sheet metal and bent around the rod as particularly shown in Fig. 3.

This puzzle may also be formed of sheet metal, the rings being formed integral in the metal and twisted into the interlocking position shown.

The puzzle is to remove a continuous cord encircling the end stem 7, which cord for convenience of description, will be described as having one side 22 and an opposite side 23 with a looped end 24; the two side portions of the cord being secured together by a knot 25.

The solution of the puzzle is as follows, reference being had to Figs. 4 to 11, inclusively: The loop 24 is first passed up through the end ring 17, as shown in Fig. 4, thence over the hook 20 and drawn back through the ring 17 so as to encircle the end stem 19, as shown in full lines in Fig. 5; the cord then being positioned with the portion 22 extending in front of the stems 10, 14, 16 and 18, with the portion 23 extending around and under the rod 5 between the stems 7 and 10 and joining the loop 24 in front of the projection 21. The loop 24 is then drawn to the position shown in dotted lines in Fig. 5 and passed to the rear of the puzzle structure, whereupon the cord is drawn to the position shown in full lines in Fig. 6, so that the cord will encircle the stems 10, 14, 16 and 18 with the portion 22 extending in front thereof. In the next step the portion 22 is passed up through the ring 15, as indicated in dotted lines in Fig. 6, thus forming the loop 24 at a different point on the cord. The loop 24 is then passed up through the ring 17, as shown in full lines in Fig. 7, and passed over the hook 20 and stem 19, as before described in connection with Figs. 4 and 5, into the position shown in dotted lines in Fig. 7. The loop 24 is then elevated into the position shown in full lines in Fig. 8, whereupon it is drawn downward through the ring 15 and caused to assume the position shown in dotted lines in Fig. 8. When in this position the cord will encircle the stems 10, 14 and 16. In the next step the loop 24 is passed up through the ring 12, then up through the ring 17, skipping the ring 15, as shown in full lines in Fig. 9, and is then passed over the hook 20 and around the stem 19 and projection 21 into the position shown in dotted lines in Fig. 9. The loop 24 is then passed rearwardly and upwardly over the end stem 7, as shown in dotted lines in Fig. 10, and then brought forwardly into the position shown in full lines in Fig. 10. The cord will then encircle the stems 10 and 14 and extend upward through the ring 12 where the side portions 22 and 23 of the cord cross, with the loop 24 and portions 22 and 23 encircling the stem 18. From this point on the above steps are practically repeated; the loop 24 being carried upward through the ring encompassing the stem encircled by the loop, after which the loop is brought forward and passed through the end ring 17 and over the stem 19, after which it is again passed around the end stem 7, as described in reference to Fig. 10, and the operation repeated. For instance, from the position shown in full lines in Fig. 10, the loop 24 is passed upward through the ring 15, which is the ring encompassing the forward stem 18 encircled by the loop. The loop is then passed up through the ring 17 over the hook 20 and stem 19, then rearwardly around the rod 5 up and over the end stem 7, which operation will dispose the cord with its side portions 22 and 23 crossed in the ring 12, with the loop portion 24 extending through the ring 15 and its opposite loop portion encircling the stems 10 and 14. The portion of the cord surrounding the stems 10 and 14 will then be drawn rearwardly so as to withdraw the loop 24 from the rings 15 and 12. The cord will then encircle the stems 10 and 14 as indicated by the dotted lines —a— in Fig. 10. The loop 24 will then be passed up through the ring 9, which encompasses the forward stem 14 encircled by the cord, and then passed forward and up through the ring 17, skipping the rings 12 and 15, whereupon it is passed over the projection 21 and passed rearwardly around the rod 5. The cord will then encircle the stem 10 and pass through the ring 9 where its side portions cross, with the loop extending forwardly and around the stem 18. The forward portion of the cord is then passed up through the ring 15, thence up through the ring 17, over the hook 20, stem 19, projection 21, and rearwardly around the rod 5, and drawn rearwardly so that the loop 24 will encircle the stem 16. The loop is then passed upward through the ring 12, thence forward and up through the ring 17, over the hook 20, and around the stem 19 and projection 21, thence rearwardly around the rod 5, and drawn rearwardly so that the loop will encircle the stem 18. The loop is then brought up through the ring 15; thence passed up through the ring 17 and around the hook 20, stem 19, projection 21, and rod 5, as before described. On drawing the cord rearwardly it will be found to encircle the stem 10, as shown in dotted lines in Fig. 11. The knotted portion 25 of the cord is then held while the loop 24 is passed upward through the ring 6, thence forward and up through the ring 17, and then through the various successive steps, as previously described; the cord first encircling the stem 18, then the several stems in the enumerated order as follows: 16, 18, 14, 18, 16, and 18, and on being released from the latter assumes the position shown in full lines in Fig. 11, in which it passes up through ring 6 and through rings 9, 12 and 15, whereupon longitudinal movement of the cord in either direction will disengage it from the rings and disconnect it from the puzzle structure, thus solving the puzzle. The cord may be replaced in position around the stem 7 by reversing the movements necessary for removing it therefrom.

While I have described the loop 24 as being passed rearwardly around the stem 5, up and over the stem 7, as shown in Figs. 9 and 10, this movement of the cord is not absolutely essential, as the same result can be accomplished by passing the cord from one side of the puzzle structure to the other and straightening the cord to avoid twist. Neither is it essential to pass the cord from stem to stem in the last step as specified, as it can be advanced in the opposite direction, that is, from the stem 10, and finally released from the stem 19.

It is manifest that the number of rings and stems may be increased or diminished, as desired.

In solving the puzzle it is essential that the two portions of the cord do not become twisted as such a condition will result in failure to bring the cord to the proper position in the last steps and defeat the solution of the puzzle.

What I claim is:

1. A puzzle comprising a body portion, a plurality of interlocked fixed loops supported thereon, stems joining said loops and body and a looped cord engaging said stem intermediate of the first of said loops and said body.

2. A puzzle comprising a body portion formed of twisted wires having a plurality of loops formed on stems extending at right angles, each of said loops being bent over to encircle the next succeeding stem, and a cord encircling the body portion acting as a stem for the first loop.

3. A puzzle, comprising a series of connected stems, a ring on each of said stems encompassing the adjacent stem, a stem encircled by the end ring, and a continuous cord adapted to encircle the end stem and adapted to be removed and replaced thereon by a series of successive movements through the rings.

In witness that I claim the foregoing I have hereunto subscribed my name this 26th day of March, 1913.

WILLIAM T. RUTLEDGE.

Witnesses:
EDMUND B. PATTERSON,
W. F. STUTT.

Copies of this patent may be obtained for five cents each, by addressing the "Commissioner of Patents, Washington, D. C."